United States Patent [19]

Rosart

[11] Patent Number: 4,579,708

[45] Date of Patent: Apr. 1, 1986

[54] MOLDING OF RESINOUS EMBOSSING ELEMENTS FOR GREETING CARDS

[75] Inventor: James Rosart, Mississauga, Canada

[73] Assignee: American Greetings Corporation, Cleveland, Ohio

[21] Appl. No.: 542,675

[22] Filed: Oct. 17, 1983

[51] Int. Cl.[4] .......................... B29C 33/42; B29C 59/02

[52] U.S. Cl. .......................... 264/227; 264/219; 264/226; 264/293; 264/337; 264/338

[58] Field of Search ............ 264/220, 257, 260, 271.1, 264/219, 225, 226, 227, 337, 338, 293

[56] References Cited

U.S. PATENT DOCUMENTS

| | | | |
|---|---|---|---|
| 250,239 | 11/1881 | Hansen | 264/219 |
| 763,064 | 6/1904 | Mercer | 264/225 |
| 2,294,865 | 9/1942 | Frankenthal et al. | 264/219 |
| 2,826,811 | 3/1958 | Shiker | 29/553 |
| 3,387,351 | 6/1968 | Roosen | 264/219 |
| 3,487,133 | 12/1969 | Lindsay | 264/219 |
| 3,677,793 | 7/1972 | Blosch | 264/220 |
| 4,001,062 | 1/1977 | Iioaka et al. | 264/225 |
| 4,105,184 | 8/1978 | Sumitomo | 264/219 |
| 4,153,654 | 5/1979 | Maffitt | 264/220 |
| 4,229,400 | 10/1980 | Laurie | 264/225 |
| 4,396,448 | 8/1983 | Ohta | 264/220 |

FOREIGN PATENT DOCUMENTS

| | | |
|---|---|---|
| 351109 | 6/1931 | United Kingdom . |
| 973677 | 10/1964 | United Kingdom . |
| 1045674 | 10/1966 | United Kingdom . |
| 1097454 | 1/1968 | United Kingdom . |
| 1110216 | 4/1968 | United Kingdom . |
| 1260181 | 1/1972 | United Kingdom . |
| 1392920 | 5/1975 | United Kingdom . |

*Primary Examiner*—James Lowe
*Attorney, Agent, or Firm*—Baldwin, Egan & Fetzer

[57] ABSTRACT

A method of forming a resinous embossing plate adapted for use in an embossing and diecutting press for embossing a design onto paper greeting cards. The method comprises providing a line sketch of a design, making a photographic negative of the line sketch, and using the negative to apply the line sketch to both sides of a thin sheet of soft embossable material. Manual indenting of the design into the embossable sheet to provide a female matrix on one side of the embossable sheet. The embossed sheet is then reversed, so that the male portion of the matrix design faces upwardly, and disposed in a mold enclosure. Liquid plastic and fibrous reinforcing material is added to form a relatively low cost embossing plate. Plastic negative of the embossing plate is used in the press in conjunction with the embossing plate, for embossing the design onto the paper greeting card stock.

18 Claims, 14 Drawing Figures

MOLDING OF RESINOUS EMBOSSING ELEMENTS FOR GREETING CARDS

This invention relates in general to a resinous-like embossing member for use in a platen or cylinder press and to a method of forming such embossing member, for use in embossing a selected design onto paper greeting card stock, and more particularly relates to a method for forming a resinous-like embossing member which can be substituted for the known and conventional metal or steel die heretofore utilized in connection with the embossing of greeting cards, and yet which provides a relatively low cost embossing member which possesses a relatively long service life and which will effectively accomplish in an economical manner the embossing of greeting card stock in a platen or cylinder.

BACKGROUND OF THE INVENTION

Embossment of greeting cards is known in the prior art, but heretofore, to applicant's knowledge, such embossment has been carried out by means of metal dies, which are mounted in a press and operate in conjunction with a plastic counter to emboss a selected design onto paper stock used to form greeting cards. Such metal dies are expensive to produce and to maintain, and add considerably to the cost of producing embossed greeting cards. The more intricate the design, the greater are the costs of furnishing a metal embossing die. An embossed greeting card gives a three-dimensional contour to the conventional two-dimensional greeting card design and usually adds considerably to the aesthetic appeal of the card.

Various patents are known which relate to and are generally pertinent to the environmental area of making molded printing plates.

One of these is U.S. Pat. No, 250,239 to C. H. Hansen dated 1881, which discloses a method for making a molded printing plate which comprises a top tinfoil surface and a backing surface of plaster-of-paris, and wherein the tinfoil is indented through a layer of adhesive material by means of a stylus to produce the finished printing plate.

Pat. No. 2,826,811 dated Mar. 18, 1958 to A. Shikes discloses a hand process for metal working utilizing the steps of impressing a design upon soft metal by hand operation and by working the metal plate over a pattern until the entire design has been worked into the metal plate.

Pat. No. 4,001,062 dated Jan. 4, 1977 to Iisaka et al discloses a process for the reproduction of works of art or other artifacts by forming a mold which reproduces in negative form the surface irregularities of the original, and preparing a transparent moldment in the mold, and then preparing a photographic reproduction of the original to the same scale and joining the moldment and the reproduction in registry. The use of glass fiber cloth or mats with a hardenable silicone liquid to form the mold is taught in this patent.

None of these prior art patents discloses applicant's method for production of a resinous-like embossing plate for use in embossing a selected design into a paper greeting card, nor the relatively low cost embossing plate product resulting from the method.

SUMMARY OF THE INVENTION

The present invention provides a relatively low cost, relatively long life resinous-like embossing member, together with a novel method of forming such an embossing member, for use in an embossing and diecutting press for embossing a selected design into paper greeting card stock, and especially a method enabling the production of a resinous-like embossing member having a long service life, and which effectively and expeditiously provides for relief embossing on greeting cards or the like and in a manner which eliminates the heretofore utilized metal embossing dies that have been used for greeting card embossment enabling greeting cards to be provided with substantial relief areas thereon possessing considerable detail and at a more economically feasible price, which has generally not been feasible utilizing metal embossing dies.

Accordingly, an object of the invention is to provide a novel method of forming a resinous-like embossing member, for use in embossing a selected design into greeting card paper stock.

A still further object of the invention is to provide a method of the aforementioned type which enables the provision of substantial relief areas of considerable detail for a greeting card design, and yet one which is economically feasible.

A still further object of the invention is to provide a synthetic plastic embossing member for use in embossing a selected design into greeting card paper stock to provide a three-dimensional relief configuration for the card, thus enhancing its salability and eliminating the heretofore utilized steel dies for embossing processes on greeting cards.

A still further object of the invention is to provide a method of the above-described type which includes the utilization of a photographic negative of a selected design to apply the design to a relatively thin sheet of soft embossable material, such as aluminum sheet, for use in subsequent manual embossment or tooling of the design, and providing for production of a detailed but relatively low cost mold into which can be poured synthetic liquid plastic material, which upon hardening or setting thereof, provides the novel embossing member of the invention.

A still further object of the invention is to provide a plastic embossing member which is effective for embossing a selected design into greeting card paper stock, and which can be economically produced so as to provide a feasible arrangement for embossing a greeting card design into paper stock.

A still further object of the invention is to provide an embossing member product of the latter-mentioned type which has a long service life and which can be used to produce a considerable number of runs of embossed greeting cards without failure of the embossing plate.

Other objects and advantages of the invention will be apparent from the following description taken in conjunction with the accompanying drawings wherein:

DESCRIPTION OF PREFERRED EMBODIMENT

Greeting cards are a relative economical method of passing greetings onto another party, and embossed greeting cards in the past have resulted in substantially increased costs for producing such embossed designs, due to the fact that such embossed designs were generally produced utilizing metal embossing dies with such metal embossing dies being relatively expensive to produce. Therefore, embossed greeting cards were not ordinarily economically feasible unless there was to be a substantial run of a particular design of greeting card, so as to justify and amortize the cost of the metal embossing dies.

Figure 1:
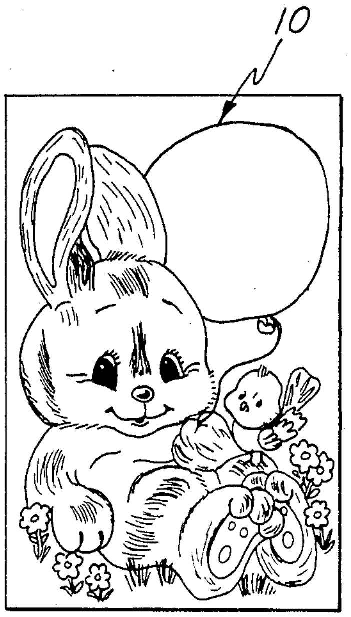
FIG. 1 is a reduced size, illustration of a design drawn on paper, which it is desired to utilize in the production of an embossed three-dimensional greeting card.

FIG. 1 illustrates a greeting card design in which as an example, it is desired to emboss a substantial portion of the design, to provide embossment or three-dimensional relief to the paper greeting card, and thus enhance its desirability and saleability.

Figure 2:
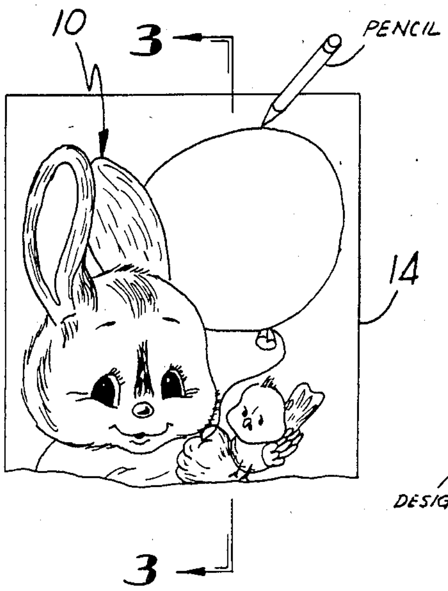
FIG. 2 is a fragmentary view of a portion of FIG. 1 illustrating the tracing of the design from the FIG. 1 illustration, with a backup of carbon paper, so that the line design is transposed to the rear side of the FIG. 1 sheet or card.
Figure 3:
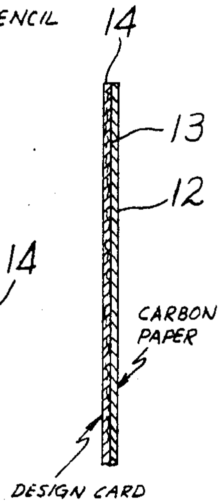
FIG. 3 is a sectional view taken generally along the plane of line 3—3 of FIG. 2 showing the carbon paper backup used on the design sheet of FIG. 1 so that the design is traced on the back thereof.
Figure 4:
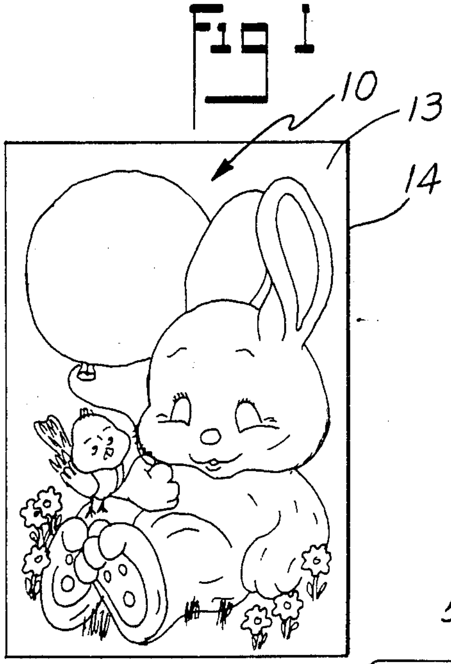
FIG. 4 illustrates the back side of the transposed design from the tracing operation of FIG. 2.
Figure 5:
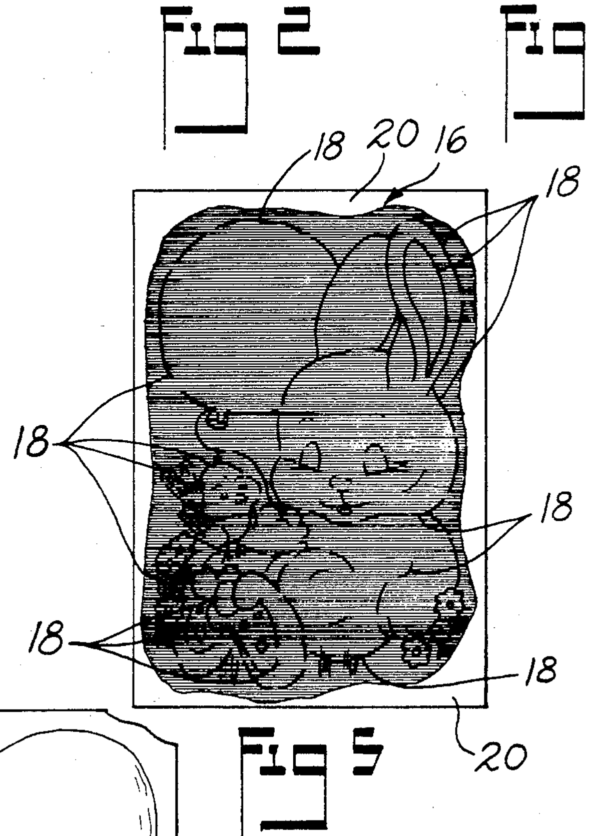
FIG. 5 is a view of the negative produced from taking a photographic picture of the FIG. 4 transposed design and with the negative having been matted for use in transposing such design onto a soft embossable sheet, such as for instance an aluminum sheet.

In the preferred method of producing a plastic or resinous embossing die to replace the known metal embossing die in accordance with the invention, the selected design 10 is traced (FIG. 2—by for instance a pencil) so that utilizing, for instance, carbon paper 12 (FIG. 3), the design is transposed to the back side 13 of the paper sheet 14 on which the design was originally drawn or shown, and with such transposed design 10 being illustrated on the back side of the sheet as shown for instance in FIG. 4. Relatively unskilled labor can be utilized in doing the work of tracing the selected design.

For designs that are generally intricate or detailed, a photographic negative 16 is preferably taken of the traced line design, resulting in a negative on which the design lines 18 are translucent or transparent to light, while the remainder of the negative is of darkened consistency, opposing the transmission of light therethrough. A negative 16 may be made of the traced design using a graphic arts camera and graphic arts negative film. The exposed film is developed in a film processor. The negative is preferably matted, as at 20, to facilitate the application of the design, using the negative, to a relatively soft embossable sheet of material, such as for instance, tempered aluminum sheet 22. Sheet 22 may be in the order of five mil (0.005") in thickness, and is flexible and very embossable or toolable and is self-sustaining in its indented or embossed form.

A preferred form of aluminum sheet is 0.005" aluminum offset printing plates presensitized on both sides thereof. The printing sheets or plates are preferably exposed on a carbon arc platemaker for approximately 50 seconds. Such an exposure step is a generally standard graphic arts procedure for producing offset printing plates, except that the image from the negative 16 is produced in register on both sides of the sheet 22, as will be hereinafter described in greater detail. A suitable commercial form of aluminum sheet or plate is that known in the printing trades as Polychrome WIN negative plate, 0.005" thick and two sided.

The matted negative 16 is utilized to place the line design onto the aluminum sheet 22 by placing the negative in overlying relationship onto the sheet or plate 22. To transfer the design, the negative and the embossable sheet are preferably punched with a conventional pin register system (not shown) to maintain registry between the negative and the metal sheet. The metal sheet and the negative are placed emulsion to emulsion, on a "Platemaker" vacuum frame using register pins and then the assembly is exposed to a high intensity source of heat and light (e.g. the aforementioned carbon arc offset platemaker) which causes passage of the light and heat through the transparent line portions of the negative thereby, in effect, burning the lines of the design image onto the metal sheet 22. The exposure time, as aforesaid, is preferably approximately 50 seconds. The sheet is placed in the aforementioned vacuum frame so that after the design image is burned onto the one side of sheet 22, the latter is turned over and the image is burned onto the other side of sheet 22 in exactly aligned relationship with the image on the first side, so that the image on the sheet 22 exists in exact registry on both sides thereof. The reason for this is to enable the subsequent step of tooling or embossing the metal sheet to occur on either side of the sheet 22 so that there can be female or recess portions as well as raised or male portions on each side of the metal sheet 22, depending on what particular relief configuration is desired for the embossed greeting card.

In any event, after the design is "burned" onto both sides of the metal sheet 22, in precisely the same spot so that the alignment exists for the lines on both sides of the sheet 22, the latter is preferably smeared (especially for intricate designs) on both sides thereof with a thin coat of a dark offset ink such as, for instance, Fine Color Rubber Based Ink, and then the ink smeared metal sheet 22 is placed into a conventional oven at preferably about 800° F. for approximately five minutes.

Such a heating step on the sheet and offset ink material generally bakes the ink onto the sheet and eliminates the usual "surface glare" of the sheet and makes the lines of the design easier to see for the subsequent tooling or embossing procedure; and moreover the temperature at which the ink and the sheet is subjected in the oven, softens the sheet 22 for better and easier workability.

The metal sheet 22, with the baked on image or design 10 on both sides of the sheet, is preferably placed upon a yieldable or resilient bed 24 on support surface 24*a* which is preferably generally horizontally oriented. Bed 24 may be, for instance, a piece of felt material of suitable thickness, and then a generally pointed or rounded end stylus 26 (e.g. wood or plastic) may be used to impress, indent or "tool" the desired design into a side surface (e.g. front side surface 27) of the metal sheet 22 from the selected side thereof. In the instance of the present example, the back side 28 of the sheet 22 is pressed downwardly against yieldable pad 24 which causes the creation of female recesses or indentations 27*a* in the front side 27 of the sheet 22 and male protrusions or embossments 28*a* on the back side 28 of the metal sheet 22. This embossing or impression of the design into the metal can be readily accomplished by relatively unskilled labor, following the burned-in lines of the design on the sheet 22.

Figure 9:
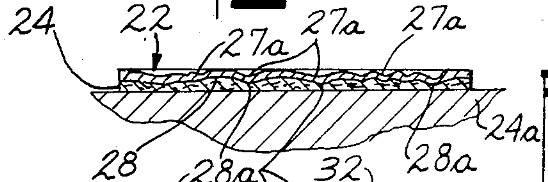
FIG. 9 is a sectional view of the metal sheet after embossment of the design thereon showing the female matrix on the top side thereof and the male matrix on the bottom or underside side thereof.

As can be best seen in FIG. 9, such tooling or embossing of the metal sheet creates a female matrix on one side of the metal sheet and a male matrix on the other side thereof in the areas where the tooling has occurred. Reversal of the sheet 22 and tooling from the opposite side thereof will, of course, create the opposite type matrix. The aforementioned heating of the sheet with the printers ink smeared thereon has softened the metal and made it more readily able to be tooled to any desired design as burned onto the sheet surface, or added detail can also be accomplished by the person doing the tooling. Preferably a first step in the above described tooling of the design is to "set" the design. This is done by placing the sheet 22 face up on a hard surface. Using a ball point pen or a like tool and firm pressure, the design is outlined on the metal sheet. This "setting" of the design is desirable because when the aluminum sheet is tooled and pushed out from the reverse side, the metal has a tendency to stretch. "Setting" the design, inhibits the tendency to stretch the metal out past the edge of the design. "Setting" also ensures a sharper more crisp edge to the design. The "hard" work surface preferably used at this "setting" stage is to limit penetration of the tool (e.g. ball point pen) into the metal sheet. Also, sharper but shallower lines can best be obtained during tooling by tooling over a more dense surface as compared to a felt pad, such as for instance a pad of paper sheets or even a hard surface such as a desk top.

Figure 10:
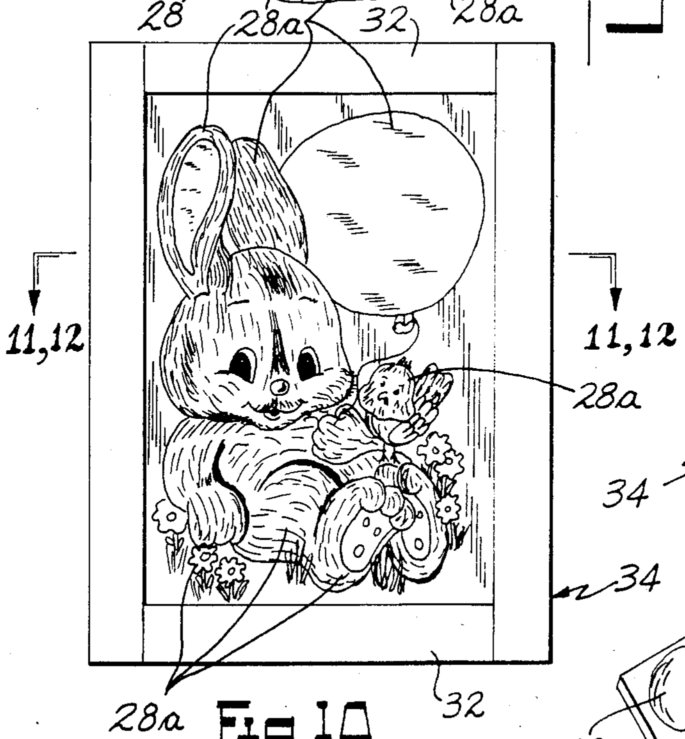
FIG. 10 is a plan view of the embossed sheet of FIG. 9 having been inverted so that the male matrix side of the metal sheet faces upwardly, and with the embossed sheet having been placed into a mold receptacle including sides.
Figure 11:
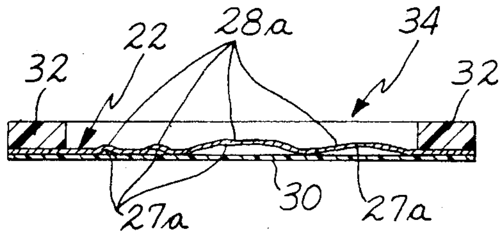
FIG. 11 is a sectional view taken generally along the plane of line 11—11 of FIG. 10 looking in the direction of the arrows, and showing the embossed metal sheet within the mold receptacle or enclosure, and with the male matrix side thereof facing upwardly in the mold enclosure.

Referring now to FIGS. 10 and 11, there is illustrated an arrangement providing for formation of a mold enclosure, so as to create a plastic embossing member in plate-like form, which is actually used in the formation of embossed greeting cards. To accomplish this, the tooled sheet 22 is reversed (turned upside down) from its FIG. 9 position, so that the male sections 28*a* are extending upwardly, while the female sections 27*a* are on the underside of the sheet. Then the sheet 22 is mounted onto a flat support board 30.

A suitable type of support board 30 has been found to be paper-type phenolic board of about 1/32 inch thickness, conventionally used, for instance, for mounting electronic circuitry thereon. However, it will be understood that other types of support board may be used, the paper-type phenolic board being given as an example of a suitable type of material. The tooled sheet 22 may be adhered to the support board 30 by any suitable means, as for example two sided tape.

Glued onto the sides of the support board 30 into a preferably rectangular configuration are strips 32 of preferably "Duron" fiberboard to form the sides of the mold enclosure 34.

"Duron" fiberboard is a high resin contact fiberboard smooth on both sides. It is generally available in four foot by eight foot by ¼ inch thick sheets and can be readily cut into one inch wide strips to form the sides 32 for the mold. It is of uniform thickness and is non-porous. While "Duron" fiberboard is satisfactory and is preferred, any material that is of consistant thickness can be used. Preferably any such material used to form the mold is relatively cheap and is generally non-porous.

The side strips 32 forming the sides of the mold may be applied to the support 30 and attached tooled sheet 22 using for instance conventional wood flooring tile cement, or the like, thus forming a mold cavity having an open top and defined by the side walls 32 and the bottom support board 30, with the tooled metal sheet 22 being disposed within the mold cavity.

Figure 13:
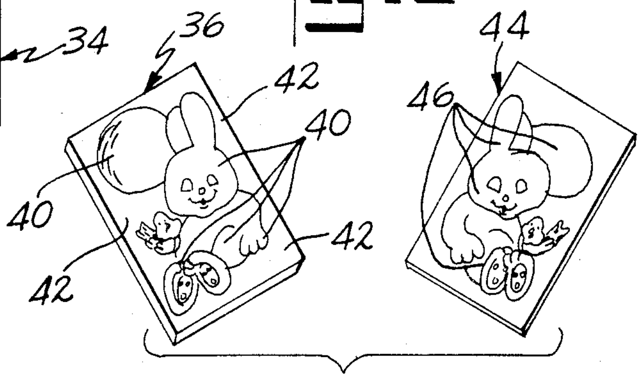
FIG. 13 is a generally perspective view illustrating on the left, the hardened resinous-like embossing plate that is the result of the molding process of FIGS. 1–12 and showing on the right, the counter for use with such plastic embossing plate in an embossing and diecutting press for the embossment of the paper stock greeting cards, by inserting the greeting card stock between the female matrix plastic plate and the counter, and applying pressure (and sometimes heat) thereto.

Next the mold interior is preferably waxed utilizing for instance fiberglass mold wax, or paste wax containing no silicates and then is preferably buffed by means of for instance a soft cloth, to produce somewhat of a shine on the wax, and then the mold is set aside for a predetermined period of curing time, e.g. three to four hours, before pouring the plastic embossing plate forming material into the mold to form upon hardening thereof, the actual embossing plate 36 (FIG. 13). The wax is for the purpose of preventing sticking of the formed embossing member in the mold 34.

The plastic material which is adapted to be poured into the mold 34 for actual formation of the embossing member 36 is preferably a high temperature polyester resin and is formed by mixing a hardener, such as for instance a peroxide hardener with the resinous plastic material, which is for instance a thermosetting plastic known as Product No. 2T504 polyester manufactured by Fiberglas Canada Ltd. resulting in a liquid plastic which can then be poured into the mold to just, initially, cover the entire surface of the tooled metal sheet 22. A suitable type of hardener material for the polyester resin is known as M.E.K.-P peroxide hardener made up of 50% methyl ethyl ketone and 50% di-methyl-phtalate to which is added 0.5 to 1% peroxide. Approximately 1 c.c. of hardener per 8 oz. of polyester resin is preferred.

Figure 12:
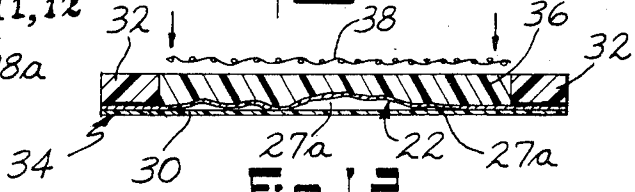
FIG. 12 is a sectional view generally similar to FIG. 11 but showing the pouring of liquid plastic into the mold enclosure to cover the male matrix, and with the application to the liquid plastic of fibrous mats, which are adapted to be pressed into the liquid plastic to build in conjunction with the plastic upon hardening thereof, a high strength resinous embossing plate for use in embossing the greeting card paper stock.

Next a fibrous mat 38 (FIG. 12) is pressed into the open top of the mold into the liquid plastic so as to preferably cover the entire surface of the metal sheet. A suitable type of fibrous mat is a one ounce fiberglass mat, and such fiberglass mat may then be rubbed until all the air bubbles have been eliminated therefrom, so that there will be no holes formed in the working surface of the finished embossing die. A light mat, such as the aforemention one ounce mat, makes it easier to eliminate air bubbles from the embossing plate mold. Other forms of fiberglass reinforcement useable are fiberglass cloth and roving, but the latter are generally not as strong as the mat form.

After this first layer of fibrous material mat has been rubbed to eliminate all air, more of the liquid plastic and hardener is poured into the mold, and succeeding layers of fibrous mat can be pressed into the liquid plastic. When a layer of mat becomes hard to saturate, more plastic can be added. After preferably six or seven layers (although the number may be less, but preferably not less than four) of fibrous mat are pressed into the mold top, with the extent of mold sides illustrated (e.g. $\frac{1}{4}$ inch high walls) the mold will be filled just slightly over the sides of the mold. Next a sheet of 5 mil "Mylar" and a waxed glass plate (not shown) can be placed on top of the plastic and mat filled mold, working it lightly back and forth until any excess resin and air bubbles therein have been forced out without distorting the underlying embossed sheet 22, thereby completing the formation of the embossing plate. The plastic used to form the embossing plate 36 should have good dimensional stability, high compression strength and good heat resistance and the aforedescribed thermosetting plastic material is optimumly effective.

After about two hours curing time, the filled mold can be turned upside down and tapped, which will cause the plastic embossing plate 36 to fall out from the mold 34, and then more copies of such embossing die plate can either be made in the mold, or the mold can be stored for future use.

After removal from the mold, the embossing plate is suitable for placement into a press such as for instance a Bobst type press. As best seen in FIG. 13, such finished embossing plate 36 in the embodiment illustrated is a female matrix plate and possesses local areas 40 recessed into the plate surface as compared to the adjoining surface areas 42 of the plate.

As, also, shown in FIG. 13, there is provided a counter 44 which is adapted for use with the formed embossing die plate 36 to produce the impression or relief in the paper stock of the greeting card. Such counter 44 is preferably formed of a fast setting thermosetting plastic mixture of liquid acrylic polymer and a powdered acrylic polymer within the preferred proportions of approximately 75 ml. of liquid polymer to about 175 ml. of powdered polymer. It is possible to use anywhere from a 50 ml.-150 ml. to a 100 ml.-150 ml. ratio of liquid to powder to form the counter, but the aforementioned 75 ml.-175 ml. ratio mixture seems to be best. A typical and suitable acrylic polymer for use in forming the counter is that known as methyl methacrylate liquid and methyl methacrylate powder, otherwise described respectively as liquid acrylic polymer, type F, cross linking and acrylic powder, self curing, noncolour and stable, available for instance from Acridenta Dental Manufacturing Company of Toronto, Canada. This paste-like mixture is formed into the counter 44 by cycling the press and mounted embossing plate 36 against a quantity of the paste polymer to thereby form the acrylic polymer under pressure, thereby resulting in a male matrix 46 as illustrated in FIG. 13.

Instead of transferring the selected card design to the metal sheet 22 by means of a photographic negative and a carbon arc platemaker as above described, for less detailed designs, the selected design may be transferred directly to a preferably tempered embossable sheet 22 by sandwiching sheet 22 between two sheets of carbon paper (inked sides facing the sheet) and then placing the card 14 with the design thereon (FIG. 1) over the carbon paper on one side, and tracing over the design 10 thereon to transfer such design simultaneously to both the front and the back sides of sheet 22.

To ensure that the tracings from the carbon paper adheres firmly to the sheet 22, a flame from such as for instance a propane torch, may be passed lightly back and forth over the carbon lines to cause melting thereof, helping the traced design lines to become more permanent and resistant to rubbing off during the subsequent tooling of the sheet 22 for forming the embossments and recesses therein in the manner heretofore described. The first described photographic process is preferred however, especially when the selected design involves any substantial detail.

Figure 14:
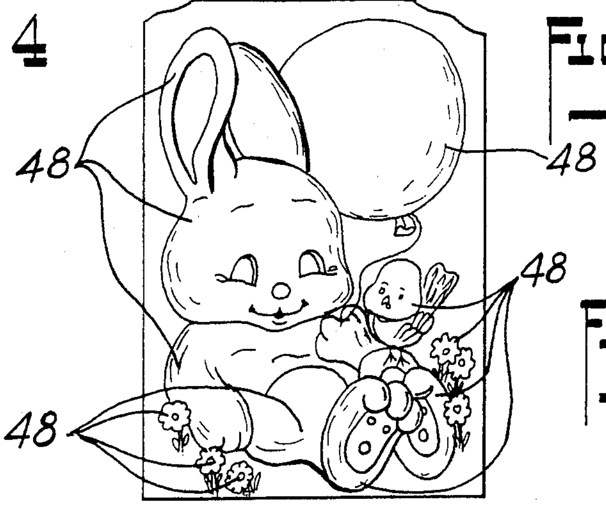
FIG. 14 is a top or front plan view showing a greeting card having been produced utilizing the female matrix embossing plate and the associated male counter of FIG. 13 in a press, to produce a three-dimensional or embossed design of greeting card.
Figure 6:
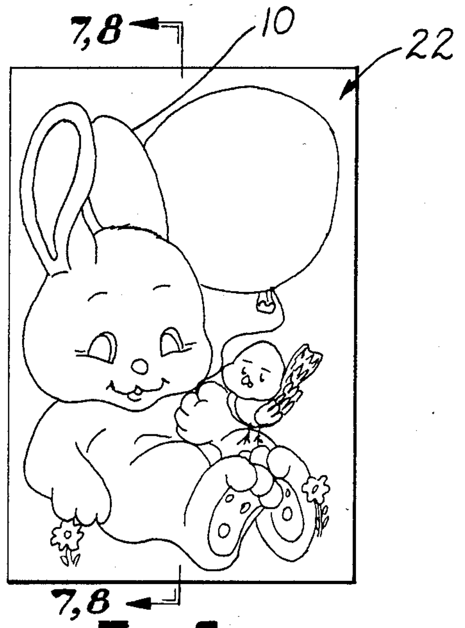
FIG. 6 is a plan view of the embossable metal sheet showing the production of the design thereon utilizing the matted negative of FIG. 5, whereby the line design is burned into the surface of the embossable sheet of FIG. 6, with the design having been reproduced both on the front and back sides of the embossable sheet in exact aligned relation with one another.
Figure 7:
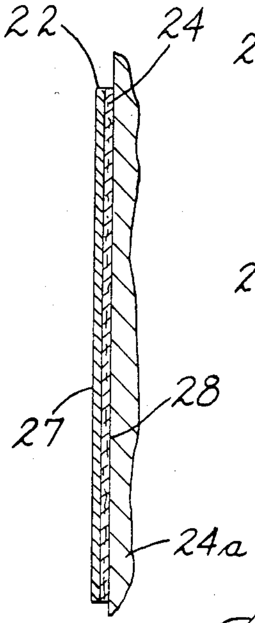
FIG. 7 is a sectional view taken generally along the plane of line 7—7 of FIG. 6 showing the FIG. 6 sheet disposed on a resilient or yieldable backup bed surface for providing for the manual production of an embossed design onto the embossable sheet.
Figure 8:
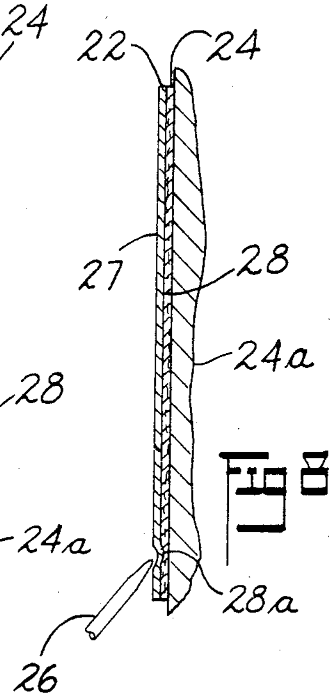
FIG. 8 is a view similar to FIG. 7, but illustrating the manual tooling operation of producing certain areas of embossment or indentment in the metal sheet, utilizing a generally pointed stylus, to produce embossment of the design figure.

In embossing the greeting cards, the card stock with the design printed thereon by a printing press, is passed between the embossing matrix plate 36 and the counter 44 on an embossing and diecutting press such as for instance the aforementioned Bobst press, and the paper stock is thus embossed resulting in selected areas 48 of the design on the card 50 being raised or elevated as shown in FIG. 14, which enhances the appearance of the card and its saleability. Generally speaking, the heavier the paper stock, the better are the results with the embossing plate 36. Paper thickness of anywhere from about 0.004 inch to about 0.012 inch have produced good results. An embossing pressure of approximately 2,000 p.s.i. is preferred.

The plastic embossing plate of the invention and associated counter, have a long service life, with runs having been made of well over 100,000 embossments or imprintations with a single plate unit without any visible deterioration thereof, which makes the embossing plate of the invention especially economically feasible for use in producing embossed greeting cards of high quality and detail.

From the foregoing discussion and accompanying drawings it will be seen that the invention provides a novel, plastic embossing member for use in a press together with a novel method for forming the plastic embossing member and associated counter, for use in embossing selected designs into paper greeting card stock. The plastic embossing member of the invention provides an economically desirable substitution for the conventional metal dies previously used to obtain embossment of greeting cards.

The invention also provides a method which utilizes relatively unskilled labor in the production of the plastic embossing member and associated counter and results in an embossing member and counter which have a long service life, thereby enhancing the economic considerations of utilizing the plastic embossing member in the embossment of greeting cards.

The terms and expressions which have been used are used as terms of description, and not of limitation, and there is no intention in the use of such terms and expressions of excluding any equivalents of any of the features shown or described, or portions thereof, and it is recognized that various modifications are possible within the scope of the invention claimed.

What is claimed is:

1. In a method of forming a resinous-like relatively low cost embossing member for embossing a selected design into paper greeting cards comprising; providing a selected design, transferring the design in generally line form to a side of a generally self sustaining relatively thin metal sheet of relatively soft embossable material, namely aluminum sheet, applying said sheet to a generally hard surface and utilizing a blunt nosed tool and pressure to initially completely outline the design about the periphery thereof from the side of said sheet, then transferring said sheet to a yieldable support and subsequently manually indenting the remainder of the design within said outline into said sheet from the side thereof utilizing a tool, said initial outline of the design inhibiting the tendency of the metal of sheet to stretch past the edge of the design during said subsequent indenting of said design into said sheet, and then embodying said indented sheet in a walled mold enclosure so as to utilize said indented sheet as a defining mold surface and introducing liquid plastic and fibrous material into the mold enclosure to form, upon setting of the plastic, an embossing member comprising a fiber reinforced plastic three-dimensional reproduction of the design, and then removing the embossing member from the enclosure and from said indented sheet for use of said fiber reinforced plastic embossing member in an embossing and diecutting press for pressure embossing the design into paper greeting card stock.

2. A method in accordance with claim 1 wherein said transferring of the design to a side of said sheet includes making a photographic negative of said selected design, and using said negative in conjunction with heat and light to transfer the design in generally line form to said sheet.

3. A method in accordance with claim 2 wherein said sheet consists of presensitized printing offset aluminum sheet of approximately 0.005 of an inch thickness, and utilizing a carbon arc platemaker in conjunction with said photographic negative to transfer said design to said of said sheet.

4. A method in accordance with claim 1 wherein said transferring of the design to a side of said sheet includes tracing said design onto said side of said sheet utilizing carbon paper.

5. A method in accordance with claim 4 wherein said sheet consists of tempered offset printing aluminum sheet of approximately 0.005 of an inch thickness, said tracing of said design including sandwiching said sheet between two sheets of carbon paper with the inked sides thereof facing said sheet, and then tracing over said design while the latter is on said sandwiched sheet and carbon paper, to transfer said design simultaneously to both the front and the back sides of said sheet in generally exact registry on both sides thereof, and then subjecting the traced designs on said sheet to heat to generally melt the carbon lines on said sheet to cause said lines to be more firmly adhered to said sheet for subsequent handling thereof, and wherein said indenting includes indenting of selected portions of the line design against a yieldable support from both sides of said sheet.

6. A method in accordance with claim 3 including applying offset ink to said sheet after said transfer of said design to said sheet, and then heating said ink smeared sheet in an oven at approximately 800° F. for a predetermined time, prior to indenting the transferred design into said sheet for formation of said mold surface.

7. A method in accordance with claim 1 wherein said liquid plastic is a thermosetting plastic, and including pouring said liquid plastic into the mold enclosure to initially just cover the entire surface of the indented sheet, and then putting alternate layers of fibrous material and the liquid plastic into said mold enclosure until the latter is completely filled, to strengthen said formed embossing member.

8. A method in accordance with claim 7 wherein said liquid plastic comprises a high temperature polyester resin and said fibrous material layer comprises one ounce fiberglass mat.

9. A method in accordance with claim 8 wherein said embossing member is permitted to cure approximately two hours in said mold enclosure prior to removal from said mold enclosure.

10. A method in accordance with claim 9 including taking the hardened embossing member and mounting it in a press, preparing a fast setting thermosetting plastic mixture of liquid acrylic polymer and powdered acrylic polymer to provide a paste thereof, cycling the press and mounted cured embossing member against a quantity of the paste polymer to form the latter under pressure conforming to the design on said embossing member, and resulting in a plastic counter for use with said embossing member, and then using the counter member in conjunction with the embossing member to emboss the paper card stock placed therebetween in the press upon operation of the latter.

11. A method in accordance with claim 1 wherein said indented sheet is enclosed on the sides thereof by approximately one-quarter inch thick side members secured to a baseboard, to define thus provide an open top mold cavity, and defining said mold enclosure, with the indented sheet mounted therein in secured relation preparatory to pouring the liquid plastic therein to form the embossing member in plate-like form.

12. A method in accordance with claim 1 wherein said fibrous material comprises a lightweight fiberglass mat and including the step of inserting said fiberglass mat into the introduced liquid plastic in the mold, working the mat until it is completely saturated with liquid plastic and forcing the mat down to a lower position in the mold while rubbing the mat to eliminate air bubbles, and then subsequently pouring in more liquid plastic into the mold and inserting more mates therein until the mold is completely filled with plastic and coacting plastic saturated mats.

13. A method in accordance with claim 1 wherein said sheet consists of thin softened offset printing aluminum sheet of approximately 0.005 inch thickness, said transferring of said design including the transfer of the design in generally line form to both the front and the back sides of said sheet in generally exact registry on both sides thereof, said indenting including indenting of selected portions of the design against said yieldable support alternately from both sides of said sheet so as to provide protruding convex details of said design on both sides of said sheet.

14. A method in accordance with claim 13 wherein the indented sheet is used in said mold with certain of the convex portions of the indented sheet facing upwardly, and waxing the interior of the mold enclosure including said sheet and buffing the wax and letting its stand for a predetermined period of time prior to introducing the liquid plastic and coacting fibrous material into the mold enclosure.

15. A method in accordance with claim 13 including waxing the upwardly facing surface of said indented sheet with a fiberglass mold wax and then buffing said wax surface to produce a wax shine on said surface, and then setting the mold enclosure with the attached indented sheet aside for a predetermined period of time before introducing the liquid plastic and the fibrous material into the mold enclosure cavity.

16. A method in accordance with claim 15 including making a photographic negative of the selected design and using said negative in conjunction with a carbon arc platemaker to provide heat and light, to accomplish said transfer of the line design, and through the negative, to the respective side of said sheet, and then applying offset ink to said sheet and heating the inked smeared sheet in an oven at approximately 800° F. for approximately five minutes so as to make the lines of the design on the sheet easier to see for the subsequent outlining and indenting steps on said sheet.

17. A method in accordance with claim 16 wherein said liquid plastic comprises a high temperature polyester thermosetting resin and hardener and said fibrous material comprises lightweight fiberglass mat, and including the step of pouring the liquid plastic into the mold enclosure to initially just cover the entire surface of the indented sheet, and then inserting said fiberglass mat into the introduced liquid plastic in the mold enclosure, working the mat until it is completely saturated with liquid plastic and forcing the mat down to the lowermost position in the mold enclosure while rubbing the mat to eliminate air bubbles, and then subsequently pouring in more liquid plastic into the mold and inserting more of said mats therein, to provide alternate layers of fiberglass material and liquid plastic until the mold is completely filled with plastic and coacting plastic saturated mats, and any excess air bubbles are forced out without distorting the underlying indented sheet, and then permitting the formed embossing member to cure approximately two hours in the mold enclosure prior to removal from the mold enclosure.

18. The method in accordance with claim 17 wherein said hardener for the liquid plastic is a peroxide hardener mixed with the polyester resin in an amount of approximately 1 c.c. of hardener per 8 oz. of polyester resin, and wherein the fiberglass mats are one ounce fiberglass mats covering substantially the entire confronting surface of the metal sheet.

* * * * *